United States Patent

Nakamura et al.

[11] Patent Number: 5,325,764
[45] Date of Patent: Jul. 5, 1994

[54] COFFEE EXTRACTOR

[75] Inventors: Toshio Nakamura, Osaka; Yukitoshi Kunihiro, Kawanishi; Yoshiyuki Ujino; Masaaki Sirakawa, both of Nishinomiya; Hideo Obata, Ibaraki, all of Japan

[73] Assignee: Matsushita Electric Industrial Co., Ltd., Osaka, Japan

[21] Appl. No.: 3,575

[22] Filed: Jan. 13, 1993

[51] Int. Cl.⁵ .................................. A47J 31/00
[52] U.S. Cl. ........................ 99/282; 99/283; 99/305
[58] Field of Search ............ 99/279, 280, 290, 295, 99/298, 302 R, 282, 283, 300, 304, 305, 306, 307, 308, 309

[56] References Cited

U.S. PATENT DOCUMENTS

| | | | |
|---|---|---|---|
| 3,405,630 | 10/1968 | Weber | 99/282 |
| 3,793,933 | 2/1974 | Weber | 99/302 R |
| 3,804,635 | 4/1974 | Weber | 99/302 R |
| 3,844,206 | 10/1974 | Weber | 99/295 |
| 4,706,555 | 11/1987 | Nakamura et al. | 99/283 |
| 4,790,240 | 12/1988 | Henn et al. | 99/283 |

Primary Examiner—Stephen F. Gerrity
Assistant Examiner—Reginald L. Alexander
Attorney, Agent, or Firm—Stevens, Davis, Miller & Mosher

[57] ABSTRACT

A purifying unit containing an adsorbent is positioned between the discharge outlet of a discharge pipe from which boiled water is discharged, and an extracting chamber, so that boiled water flows into the extracting chamber after detrimental components are removed from the boiled water by the purifying unit. Further, a passage change-over section is provided in order to circulate water through the heater until the water is heated up to a temperature suitable for extraction of coffee, and the passage change-over section allows water to be discharged into the extracting chamber from the discharge outlet of the discharge pipe when the water is heated up to the suitable temperature.

5 Claims, 4 Drawing Sheets

COFFEE EXTRACTOR

BACKGROUND OF THE INVENTION

The present invention relates to a drip type extractor, and in particular to a coffee extractor incorporating a hot water purifying device.

RELATED ART

In general, there have been prosperously used drip type coffee extractors in which coffee beans are pulverized by a mill, and are then fed into an extracting chamber, where hot water is poured-onto to the thus pulverized coffee beans.

Referring to FIG. 4, the structure and operation of a drip type coffee extractor of the above-mentioned kind will hereinbelow be explained.

The body 1 of the coffee extractor is composed of a water tank 2, an extracting chamber 3 and a coffee storage container 4 positioned below the extracting chamber 3 and a heater section 5 for keeping a temperature of coffee in the coffee storage container 4.

Further, a paper filter 6 is set in the extracting chamber 3 and then pulverized coffee meal is put into the filter. When, the heater section 5 is energized, water in the water tank 2 is drawn out from the bottom of the tank 2 into a pipe 8 through a check valve 7, and is then heated by the heater section 5 so as to be turned into hot water. Further, the hot water is raised upward through a riser pipe 9 so as to be led to a position above the extracting chamber 3. Accordingly, the hot water is uniformly poured onto the coffee meal in the extractor chamber 3, and thus coffee extract drips down and is pooled in the coffee storage container 4.

It is noted that activated charcoal as water purifying means (which is not shown) is sunk in the tank 2 of this kind of the coffee extractor in order to remove chlorinated lime contained in water to.

The above-mentioned coffee extractor has a first problem in that the removal rate of the water purifying means (activated charcoal) located in the water tank is not fully satisfactory and possibly causes propagation of germs although it can adsorb sterilizing ozone, chlorinated lime or the like.

As a second problem, the extracting time has been too long. That is, water in the water tank is led into the heater section by way of the pipe and is then poured into the coffee meal through the riser pipe after it is heated. Accordingly, water of a low temperature is always fed to the heater section from the water tank so that the volume of boiled water obtained in a unit time is less. The period from the time when the boiling water is initially poured onto the coffee mill to the time when a required quantity of coffee extract is obtained, has been relatively long, which is about twice as long as the time of coffee extraction using a hand drip system (no use of a coffee extractor). As a result, unnecessary components have been also extracted from the coffee meal, causing the thus obtained coffee to be bitter.

SUMMARY OF THE INVENTION

The present invention is devised in view of the above-mentioned problems, and accordingly, one object of the present invention is to provide a coffee extractor which can effectively purify water and has a convenient flow passage change-over section, thereby the extraction time is shortened to a time which is substantially equal to that using a hand drip system, and delicious coffee can be extracted.

Toward that end, in order to solve the above-mentioned first problem, according to the present invention, there is provided a coffee extractor incorporating a discharge pipe having a discharge outlet above an extracting chamber while a purifying unit incorporating activated charcoal is disposed between the discharge outlet and the extracting chamber, the purifying unit being of a cartridge type and being removably fixed below a spray cover facing the discharge outlet of the discharge pipe, and an annular flange for guiding hot water discharged from the discharge outlet into the purifying unit formed below the spray cover.

Further, in order to solve the second problem, according to a first aspect of the present invention, there is provided a coffee extractor incorporating a body, a water tank, an extracting chamber for extracting coffee, a riser pipe led from the bottom of the water tank through a check valve, a means for heating water flowing into the riser pipe, a passage change-over housing to which the upper end of the riser pipe is connected, a discharge passage communicated with the passage change-over housing, a valve port formed in the lower section of the passage change-over housing, for returning hot water into the water tank, a valve element for opening and closing the valve port, and a driving mechanism for causing the valve element to close the valve port when the temperature of hot water rises up to a set value.

With the first aspect of the present invention, activated charcoal incorporated in the purifying unit is heated up to a high temperature by hot water flowing therethrough, so as to have an effective adsorbing function, and further to serve as catalyst for decomposing and dispelling chlorinated lime or the like in a gas phase.

Further, since water in the water tank is heated and circulated until the temperature of hot water reaches a value near the boiling point, the water has been fully heated upon initiation of extraction, thereby it is possible to obtain a required quantity of boiling water within a relatively short period.

These and other features and advantages of the invention will be more completely understood from the following detailed description of the preferred embodiments of the invention with reference to the accompanying drawings in which:

DESCRIPTION OF THE PREFERRED EMBODIMENTS

Figure 1:
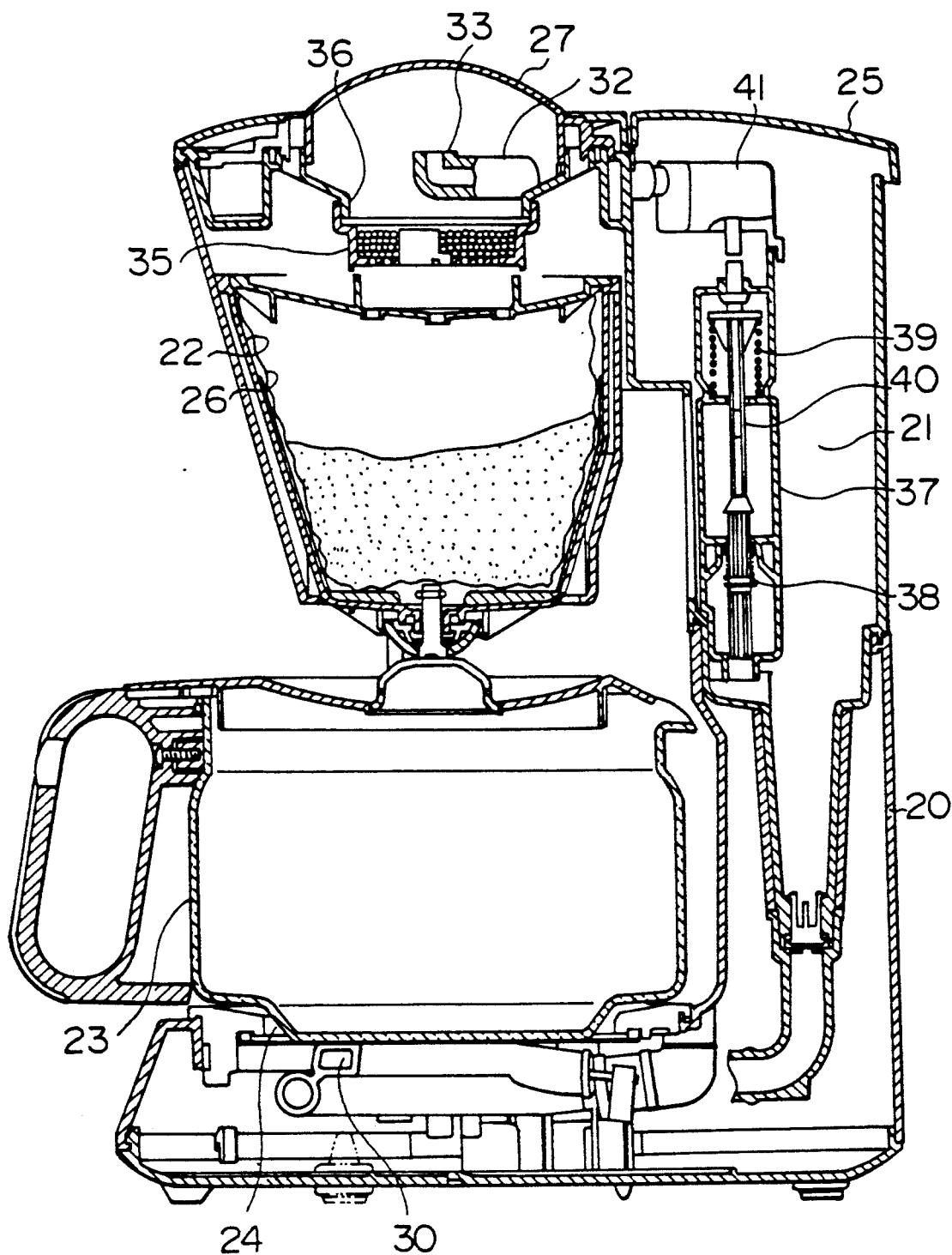
FIG. 1 is a longitudinal sectional view illustrating a coffee extractor in an embodiment form of the present invention.

Referring to FIG. 1, an embodiment of the present invention will be herein below explained. The first feature of this embodiment resides in a purifying device. That is, a purifying unit 35 in which activated charcoal is filled is arranged above an extracting chamber 22, and accordingly, hot water discharged from a discharge outlet 33 of a discharge pipe 32 is led through the purifying unit 35 and is then poured into the extracting chamber 22.

In more detail, the purifying unit which is of a cartridge type, is removably fitted below a spray cover. 27. The cartridge type purifying unit 35 has water percolating nets at its upper and lower surfaces between which coconut activated charcoal having a large particle size as pulverized activated charcoal 35 is filled. The discharge outlet 33 of the above-mentioned discharge pipe 32 is opposed to the inner surface of the spray cover 27, an annular flange 36 is formed inside of the lower part of the spray cover 27.

With this arrangement, hot water is discharged and dispersed, toward the inner surface of the spray cover 27 from the discharge outlet 33, and then it flows into the purifying unit 35. Further, it flows down onto coffee meal in the extracting chamber 22 from the purifying unit 35, and accordingly, it is turned into coffee extract.

It is noted that the activated charcoal 35 in the purifying unit not only adsorbs trihalomethane, chlorinated lime, funguses or the like, but also catalytically decomposes and dispels chlorinated charcoal in a gaseous phase since it is heated to a high temperature by hot water having a temperature of 95 deg.C. Accordingly, trihalomethane, detrimental to the human body, can be completely removed from water and chlorinated charcoal, and fungous odor and the like can be eliminated from the water, thereby it is possible to extract safe and delicious coffee.

Figure 2:
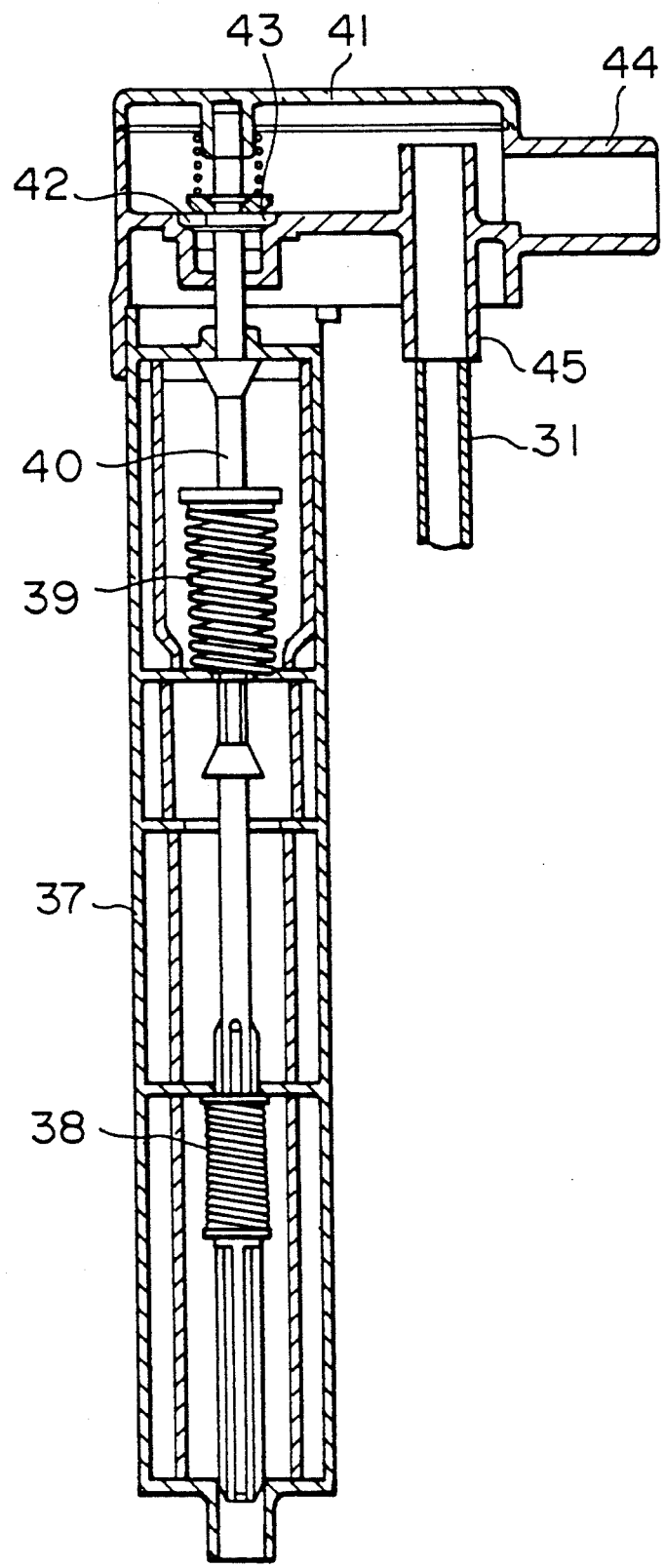
FIG. 2 is a sectional view illustrating a passage change-over section of the coffee extractor shown in FIG. 1.
Figure 3:
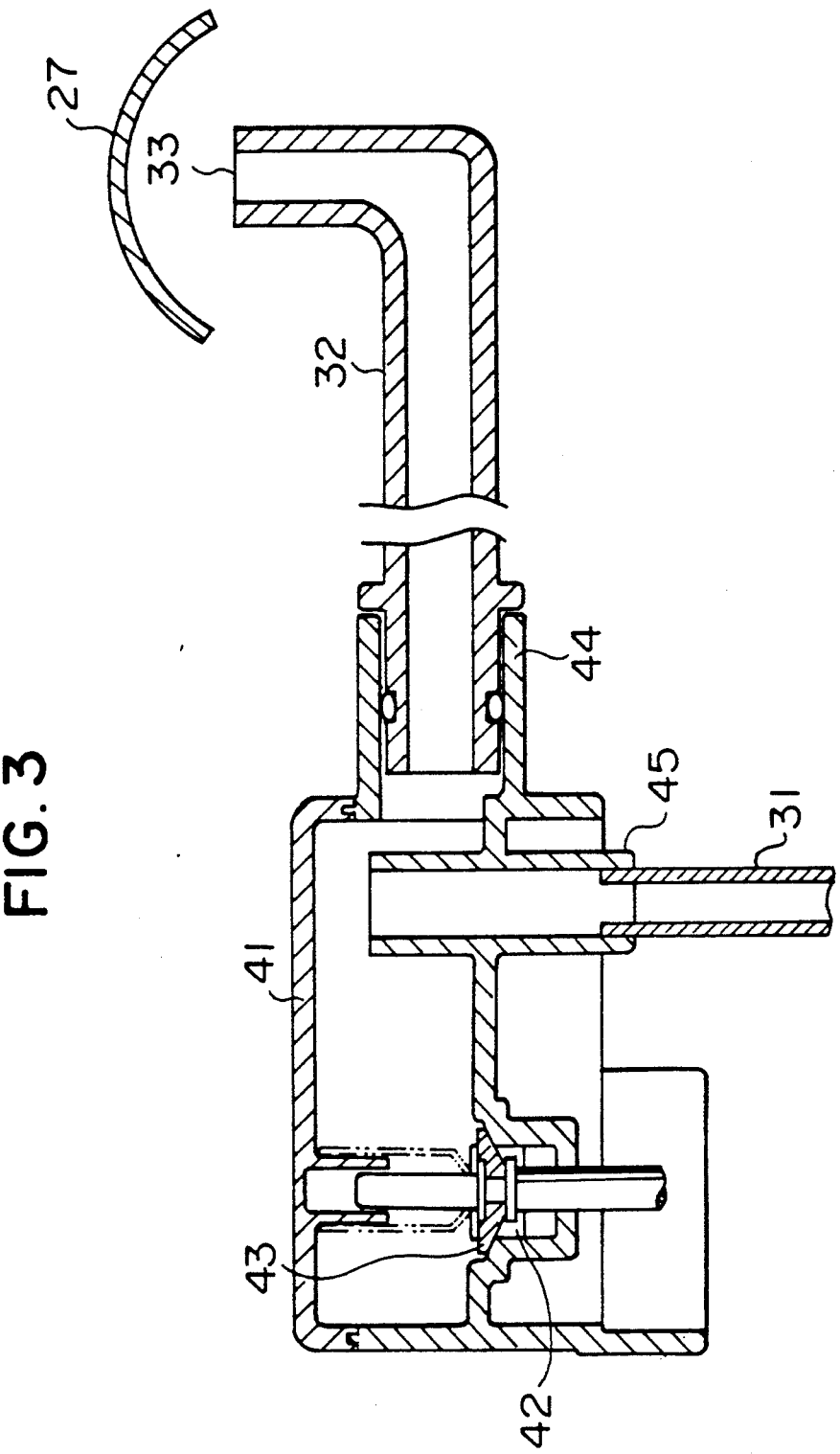
FIG. 3 is a sectional view illustrating a passage change-over housing of the coffee extractor shown in FIG. 1.
Figure 4:
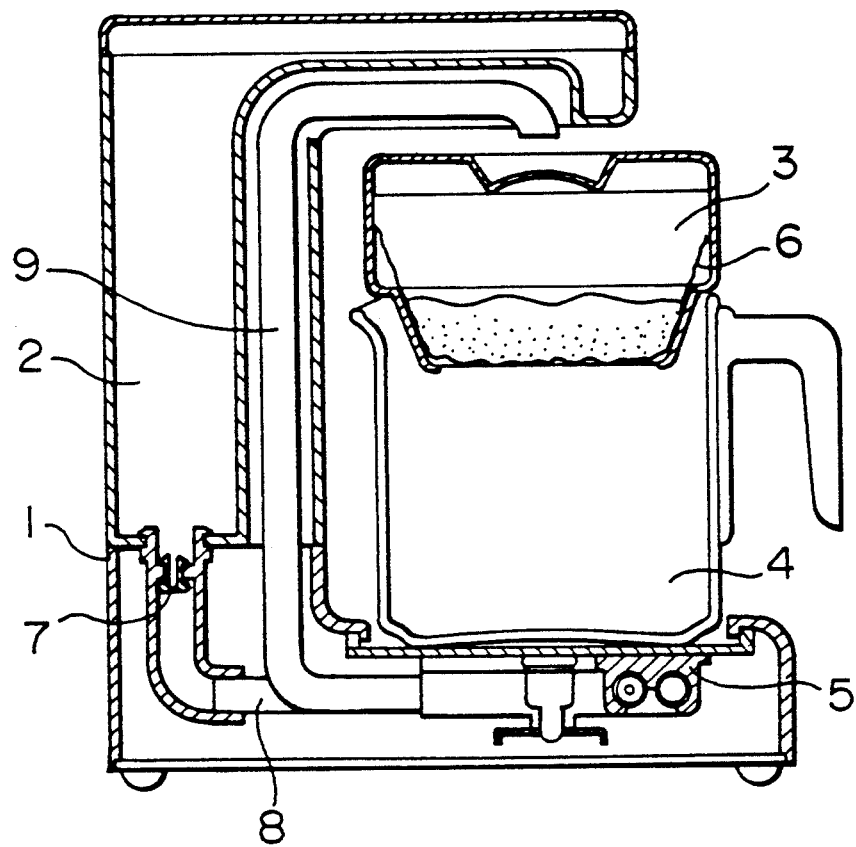
FIG. 4 is a sectional view illustrating a conventional coffee extractor.

The second feature of this embodiment resides in the arrangement of a passage change-over section. Water from a water tank 21 flows through a heating section several times in order to heat the water to a temperature of about 95 deg.C which is suitable for extraction of coffee. At this temperature, the hot water is discharged from the discharge outlet 33. Accordingly, a sensor detects such a condition that water in the water tank 21 is heated up to a temperature at which the temperature of discharged water is about 95 deg.C., and actuates the passage change-over section which therefore changes over the flow passage from a hot water circulating passage into a discharge flow passage. This arrangement in this embodiment can be clearly understood from FIGS. 2 and 3.

That is, a temperature sensor section 37 is incorporated in the water tank 21, and is disposed therein with an actuating unit 40 composed of a coil-like actuating member 38 made of shaped memory alloy, so that the actuating unit extends vertically and is slidable in the vertical direction. The upper end part of the actuating unit 40 is inserted into a valve port 42 formed in the bottom plate section of a passage change-over housing 41, while the valve port 42 is adapted to be opened and closed by a valve element 43 provided in the upper part of the passage change-over housing 41. The discharge pipe 32 is connected to a first connection port 44 in the bottom plate section of the passage change-over housing 41. Further, the discharge outlet port 33 of the discharge pipe 32 is bent toward the spray corner or upward so as to be positioned above the passage change-over housing 41. Further, the valve port 42 is communicated with the water tank 21.

In the above-mentioned arrangement, water is drawn from the water tank 21 and is heated by the heating section 30, and thereafter it is led through the riser pipe 31 and into the passage change-over housing 41. When the temperature of hot water is low, the actuating member 38 made of shape memory alloy is still retracted, and accordingly, the actuating member 40 is urged upward by an urging spring 39 so that the valve element 34 opens the valve port 42. Thus, hot water having led into the passage change-over housing 41 is returned into the water tank 21 through the valve port 42, that is, water from the water tank 21 is circulated until the temperature of water discharged from the discharge outlet 33 comes to about 95 deg.C. In this arrangement, a second connection port 45 formed in the passage change-over housing 41 or the discharge pipe 32 is opened since there is no valve element, but the position of the discharge outlet 33 is located above the passage change-over housing 41 so that no hot water is discharged from the discharge outlet in this condition.

When the temperature of water in the water tank 2 comes to a value (about 65 deg. C.) with which the temperature of water discharged from the discharge outlet 33 becomes about 95 deg.C., the actuating member 38 made of shape memory alloy is extended so that the actuating unit 40 is moved downward overcoming the urging spring 39, and accordingly, the valve element 43 closes the valve port 42. Then, the passage through which water is returned into the water tank 21 from the passage change-over housing 41 is blocked, and accordingly, hot water comes up through the riser pipe 31 is discharged from the discharge outlet 33 of the discharge pipe 33.

Accordingly, the water in the water tank 21 has been fully heated at the time when the extraction of the coffee is initiated, thereby it is possible to obtain a desired quantity of boiled water required for extraction of coffee in a short time. Thus, a component having a delicious taste can be extracted from coffee meal by pouring boiled water onto the latter, and the extraction can be completed well before unnecessary components are extracted, thereby it is possible to enhance the quality of coffee extract.

As mentioned above, with the coffee extractor according to the present invention, the purifying unit is positioned in the hot water discharge section so that activated charcoal is heated up to a high temperature, and accordingly, the activated charcoal can not only adsorb trihalomethane, fungous odor and the like in hot water but also decompose chlorinated lime and dispel the same in a gaseous phase. Accordingly, trihalomethane detrimental to the human body is removed from the hot water, and therefore, delicious coffee can be extracted with no chlorinated lime, fungous odor and the like. Further, since the temperature of water from the water tank is heated and circulated until the temperature of discharged water comes to about 95 deg. C. suitable for extraction of coffee, the period required for extraction of delicious coffee can be shortened to a time which is about one half of that required for extraction of coffee with the use of a conventional coffee extractor.

What is claimed is:

1. A coffee extractor comprising:
    a body;
    a water tank disposed in said body and having a bottom section;
    an extracting chamber, disposed in said body, for extracting coffee;
    a check valve;
    a riser pipe connected to the bottom section of the water tank through said check valve and having an upper end;

means for heating water led into said riser pipe;
a passage change-over housing connected with said upper end of the riser pipe, said passage change-over section having a lower section;
a discharge passage connected to the passage change-over housing and having a discharge outlet;
a valve port formed in the lower section of the passage change-over housing, for returning hot water into said water tank;
a valve element for opening and closing the valve port; and
an actuating mechanism, disposed in the water tank, for causing the valve element to close the valve port when water in said water tank is heated up to a set temperature,
wherein the outlet end of the discharge passage is located at a position higher than said passage change-over housing.

2. A coffee extractor as in claim 1, wherein said actuating mechanism includes means for determining when the water in said water tank is heated up to said set temperature.

3. A coffee extractor comprising:
a body;
a water tank disposed in said body and having a bottom section;
an extracting chamber, disposed in said body, for extracting coffee;
a check valve;
a riser pipe connected to said bottom section of said water tank through said check valve and having an upper end;
means for heating water led into said riser pipe;
a discharge pipe in fluid communication with said riser pipe and having a discharge outlet located above said extracting chamber;
a purifying unit disposed between said discharge outlet and said extracting chamber;
a passage change-over housing connected with said upper end of said riser pipe, said passage change-over housing including a lower section;
a valve port formed in said lower section of said passage change-over housing, for returning hot water into said water tank;
a valve element for opening and closing said valve port; and
an actuating mechanism, disposed in said water tank, for causing said valve element to close the valve port when water in said water tank is heated up to a set temperature,
wherein said discharge outlet of said discharge passage is located at a position higher than said passage change-over housing.

4. A coffee extractor as in claim 3, wherein said actuating mechanism includes means for determining when the water in said water tank is heated up to said set temperature.

5. A coffee extractor as in claim 3, wherein absorbent material is incorporated in said purifying unit.

* * * * *